United States Patent
Toth

[19]

[11] Patent Number: 6,056,437
[45] Date of Patent: May 2, 2000

[54] METHODS AND APPARATUS FOR IMAGING SYSTEM DETECTOR ALIGNMENT

[75] Inventor: Thomas L. Toth, Brookfield, Wis.

[73] Assignee: General Electric Company, Milwaukee, Wis.

[21] Appl. No.: 09/139,995

[22] Filed: Aug. 25, 1998

[51] Int. Cl.[7] .................................................. A61B 6/08
[52] U.S. Cl. ............................................ 378/205; 378/19
[58] Field of Search .............................. 378/4, 8, 11, 15, 378/19, 20, 205, 206

[56] References Cited

U.S. PATENT DOCUMENTS

| | | | |
|---|---|---|---|
| 4,675,892 | 6/1987 | Plessis et al. | 378/205 X |
| 5,048,070 | 9/1991 | Maehama et al. | 378/205 |
| 5,299,250 | 3/1994 | Styrnol et al. | 378/19 |
| 5,469,429 | 11/1995 | Yamazaki et al. | 378/19 |
| 5,579,359 | 11/1996 | Toth | 378/19 |
| 5,583,903 | 12/1996 | Saito et al. | 378/19 |
| 5,745,548 | 4/1998 | Dobbs et al. | 378/205 |

*Primary Examiner*—David P. Porta
*Attorney, Agent, or Firm*—Armstrong, Teasdale; Christian G. Cabou; Phyllis Y. Price

[57] ABSTRACT

The present invention, in one form, is a system which, in one embodiment, determines an x-ray beam z-axis profile and properly positions a detector array. Specifically, in one embodiment, signals intensities from the detector array are used to determine the optimal position of the detector array. In addition, the signal intensities are utilized to adjust an aperture of a pre-patient collimator. By adjusting the collimator aperture an x-ray beam umbra is aligned with the edges of the detector array. As a result, an optimal x-ray beam is radiated toward the detector array.

29 Claims, 5 Drawing Sheets

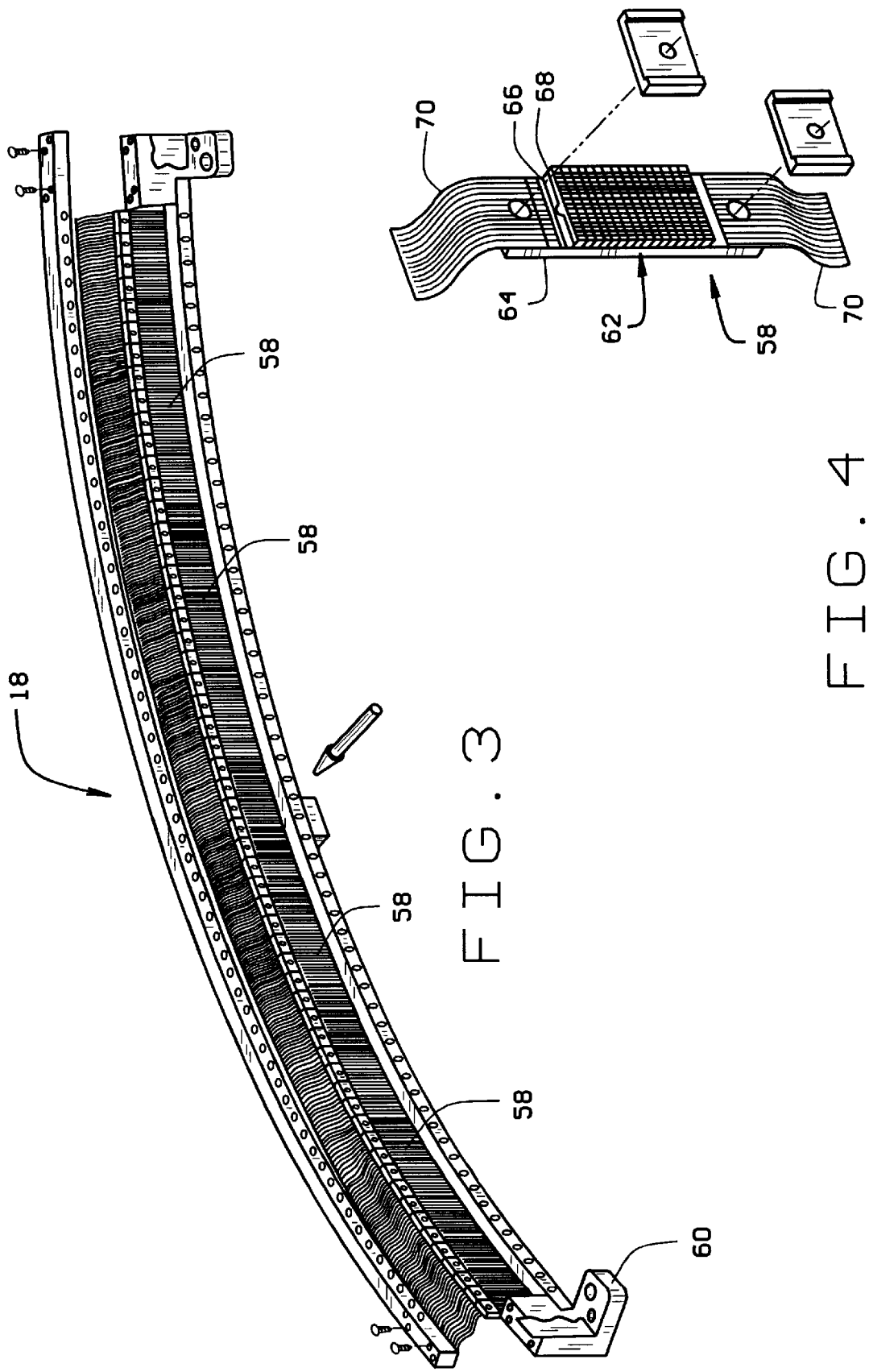

METHODS AND APPARATUS FOR IMAGING SYSTEM DETECTOR ALIGNMENT

BACKGROUND OF THE INVENTION

This invention relates generally to computed tomography (CT) imaging and more particularly, to alignment of a detector array in an imaging system.

In at least one known CT system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector.

In an axial scan, the projection data is processed to construct an image that corresponds to a two dimensional slice taken through the object. One method for reconstructing an image from a set of projection data is referred to in the art as the filtered back projection technique. This process converts that attenuation measurements from a scan into integers called "CT numbers" or "Hounsfield units", which are used to control the brightness of a corresponding pixel on a cathode ray tube display.

To reduce the total scan time, a "helical" scan may be performed. To perform a "helical" scan, the patient is moved while the data for the prescribed number of slices is acquired. Such a system generates a single helix from a one fan beam helical scan. The helix mapped out by the fan beam yields projection data from which images in each prescribed slice may be reconstructed.

At least one known CT system requires a separate alignment tool or fixture to be temporally attached to the detector array to align the detector with the x-ray source. For example, in a single slice CT system, using an alignment fixture having a trapezoidal opening, the position of the x-ray beam may be determined by measuring the beam width of the trapezoid in the projection data. From the width of the trapezoid projection, the proper position of the detector array may be determined. For multislice CT systems detector alignment is more critical. For example, in a multislice CT system artifacts are created if the x-ray umbra does not overlap the detector array. However, expanding the umbra beyond the detector array increases patient dose without increasing measurement information. In addition, the detector array must be positioned so that movement of the x-ray source and collimation and alignment tolerances do not effect the measurement information.

Accordingly, it would be desirable to provide an detector alignment system to facilitate aligning of the detector array with the x-ray beam umbra. It would also be desirable to provide such a system which improves image quality without increasing patient dosage.

BRIEF SUMMARY OF THE INVENTION

These and other objects may be attained in a system which, in one embodiment, utilizes signals from a detector array to generate difference, or ratio, signals representative of x-ray beam z-axis profile. Such difference or ratio signals can then be utilized in combination with a z-axis correction factor to determine the proper position of the detector array. The present invention is particularly applicable in multislice computed tomography system, including two and four slice systems.

In an alternative embodiment, a pre-patient collimator is adjusted based on the detector array signals to alter the z-axis profile of the x-ray beam. More specifically and in an exemplary embodiment, the collimator aperture is altered over a range of positions to determine the optimal z-axis profile of the x-ray beam. More particularly, the aperture is adjusted so that the edges of the x-ray beam umbra are aligned with the edges of the detector array.

By adjusting the detector array as described above, detector array position is optimized for the specific x-ray beam z-axis profile. In addition, the x-ray beam z-axis profile is optimized to provide measurement information without increasing patient dosage.

BRIEF DESCRIPTION OF THE DRAWINGS

FIG. 3 is a perspective view of a CT system detector array.

FIG. 4 is a perspective view of a detector module.

DETAILED DESCRIPTION OF THE INVENTION

Figure 1:
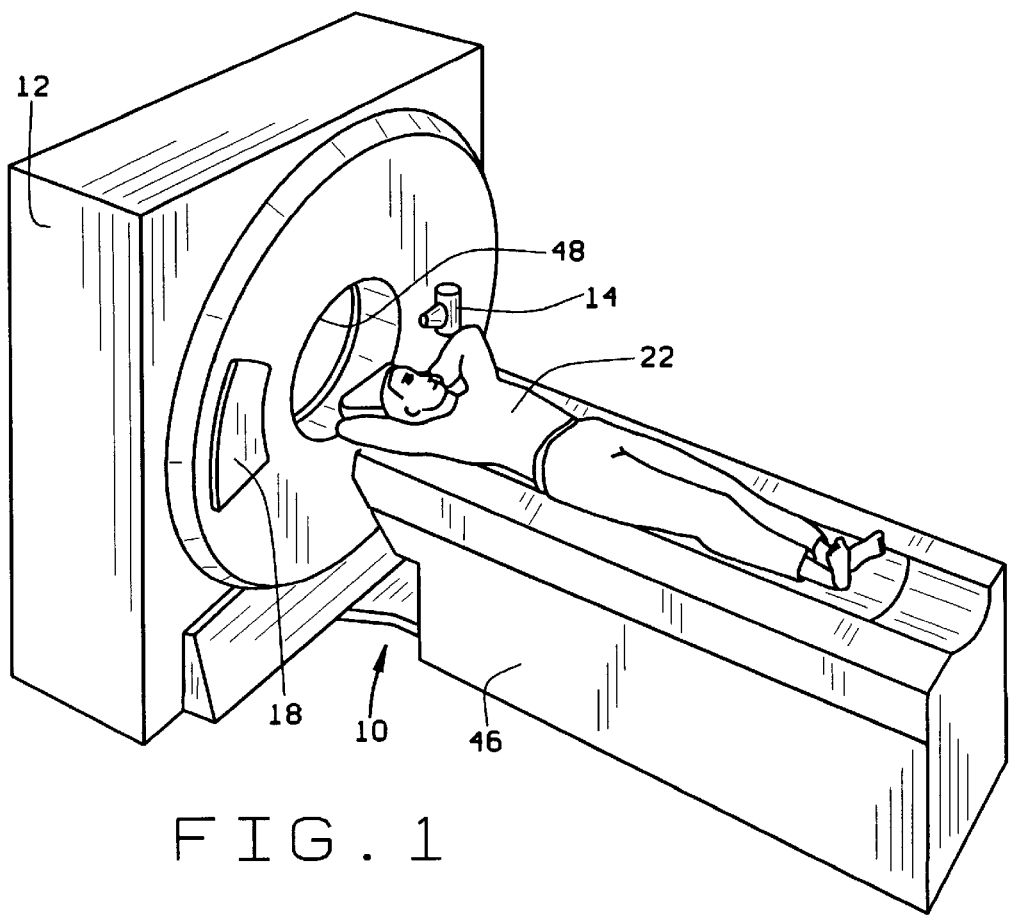
FIG. 1 is a pictorial view of a CT imaging system.
Figure 2:
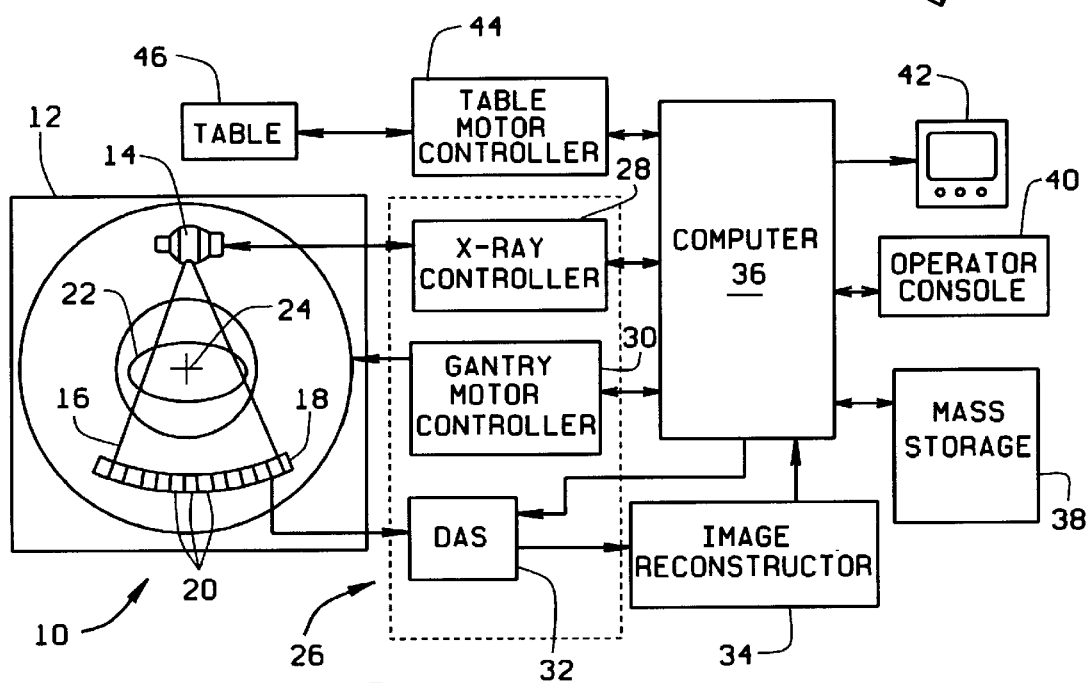
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives and supplies signals via a user interface, or graphical user interface (GUI) Specifically, computer receives commands and scanning parameters from an operator via console 40 that has a keyboard and a mouse (not shown). An associated cathode ray tube display 42 allows the operator to observe the reconstructed image and other data from computer 36. The operator supplied commands and parameters are used by computer 36 to provide control signals and information to x-ray controller 28, gantry motor controller 30, DAS 32, and table motor controller 44.

As shown in FIGS. 3 and 4, detector array 18 includes a plurality of detector modules 58. Each detector module 58 is secured to a detector housing 60. Each module 58 includes a multidimensional scintillator array 62 and a high density semiconductor array (not visible). A post patient collimator (not shown) is positioned over and adjacent scintillator array 62 to collimate scattered x-ray beams before such beams impinge upon scintillator array 62. Scintillator array 62 includes a plurality of scintillation elements arranged in an array, and the semiconductor array includes a plurality of photodiodes (not visible) arranged in an identical array. The photodiodes are deposited, or formed on a substrate 64, and scintillator array 62 is positioned over and secured to substrate 64.

Detector module 58 also includes a switch apparatus 66 electrically coupled to a decoder 68. Switch apparatus 66 is a multidimensional semiconductor switch array of similar size as the photodiode array. In one embodiment, switch apparatus 66 includes an array of field effect transistors (not shown) with each field effect transistor (FET) having an input, an output, and a control line (not shown). Switch apparatus 66 is coupled between the photodiode array and DAS 32. Particularly, each switch apparatus FET input is electrically connected to a photodiode array output and each switch apparatus FET output is electrically connected to DAS 32, for example, using flexible electrical cable 70.

Decoder 68 controls the operation of switch apparatus 66 to enable, disable, or combine the outputs of the photodiode array in accordance with a desired number of slices and slice resolutions for each slice. Decoder 68, in one embodiment, is a decoder chip or a FET controller as known in the art. Decoder 68 includes a plurality of output and control lines coupled to switch apparatus 66 and computer 36. Particularly, the decoder outputs are electrically connected to the switch apparatus control lines to enable switch apparatus 66 to transmit the proper data from the switch apparatus inputs to the switch apparatus outputs. The decoder control lines are electrically connected to the switch apparatus control lines and determine which of the decoder outputs will be enabled. Utilizing decoder 68, specific FETs within switch apparatus 66 are enabled, disable, or combined so that specific outputs of the photodiode array are electrically connected to CT system DAS 32. In one embodiment defined as a 16 slice mode, decoder 68 enables switch apparatus 66 so that all rows of the photodiode array are electrically connected to DAS 32, resulting in 16 separate, simultaneous slices of data being sent to DAS 32. Of course, many other slice combinations are possible.

In one specific embodiment, detector 18 includes fifty-seven detector modules 58. The semiconductor array and scintillator array 62 each have an array size of 16×16. As a result, detector 18 has 16 rows and 912 columns (16×57 modules), which enables 16 simultaneous slices of data to be collected with each rotation of gantry 12. Of course, the present invention is not limited to any specific array size, and it is contemplated that the array can be larger or smaller depending upon the specific operator needs. Also, detector 18 may be operated in many different slice thickness and number modes, e.g., one, two, and four slice modes. For example, the FETs can be configured in the four slice mode, so that data is collected for four slices from one or more rows of the photodiode array. Depending upon the specific configuration of the FETs as defined by decoder control lines, various combinations of outputs of the photodiode array can be enabled, disabled, or combined so that the slice thickness may, for example, be 1.25 mm, 2.5 mm, 3.75 mm, or 5 mm. Additional examples include a single slice mode including one slice with slices ranging from 1.25 mm thick to 20 mm thick, and a two slice mode including two slices with slices ranging from 1.25 mm thick to 10 mm thick. Additional modes beyond those described are possible.

Figure 5:
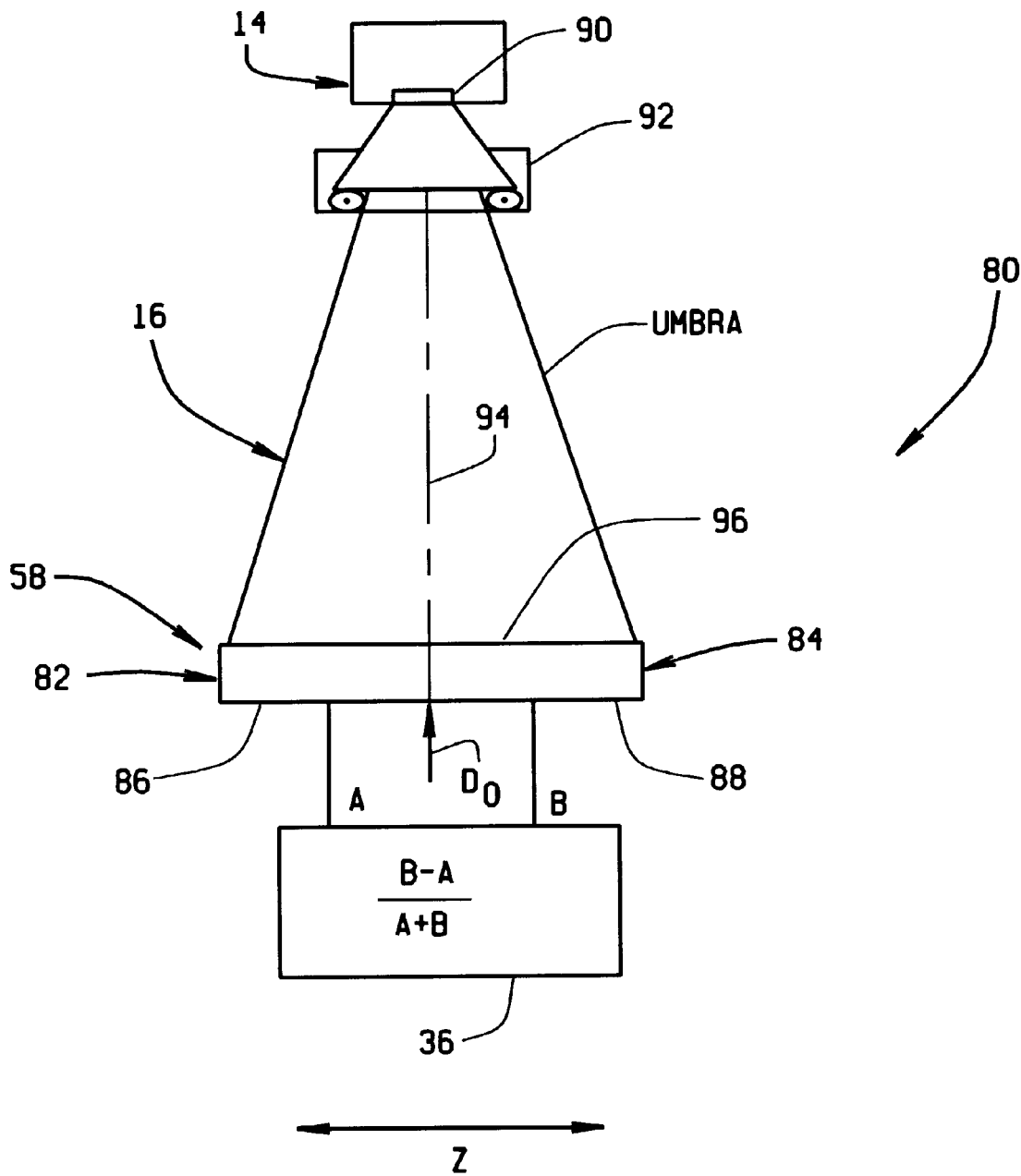
FIG. 5 is a schematic view of the CT imaging system shown in FIG. 1.

FIG. 5 is a schematic view of one embodiment of a detector array position determination system 80 in accordance with the present invention. System 80 is a "two slice" system in that two rows 82 and 84 of detector cells are utilized to obtain projection data. Detector cells 86 and 88, in addition to obtaining projection data, are utilized for determining z-axis position of detector array 18.

More specifically, and as shown in FIG. 5, x-ray beam 16 emanates from a focal spot 90 of x-ray source 14 (FIG. 2). X-ray beam 16 is collimated by a pre-patient collimator 92, and collimated beam 16 is projected toward detector cells 86 and 88. A plane 94, generally referred to as the "fan beam plane", contains the centerline of focal spot 90 and the centerline of beam 16. In FIG. 5, fan beam plane 94 is aligned with the centerline $D_o$ of exposure area 96 on detector cells 86 and 88.

The signal intensity A of the signal output by detector cell 86 and the signal intensity B of the signal output by detector cell 88 are related to the z-axis profile of x-ray beam 14 and the position of detector array 18. Specifically, the x-ray beam z axis profile and the position of centerline of detector array 18 are determined by relating the signal intensities A and B according to the ratio $[(B-A)/(A+B)]$. Such ratio can be determined by computer 36 (FIG. 2). Assuming a uniform x-ray beam 16 and response of detector array 18, umbra of x-ray beam 16 is centered over detector array 18 when signal intensity A is equal to signal intensity B.

As a result of typically aligning detector array 18 when x-ray source 14 is operating at an ambient, or room temperature, the position of detector array 18 must be offset to correct for movement of x-ray beam 16. Specifically, the typical operating temperature of x-ray source 14 may be within the range of 50% to 100% of the maximum operating temperature. As a result, thermal drift may cause the movement of the focal spot position. In order to compensate for the thermal drift of x-ray beam 16, the position of detector array 18 is adjusted, or offset from centerline of beam 16 by a z-axis correction factor. In one embodiment, the position of detector array 18 is adjusted until the centerline of detector array 18 is offset from the x-ray beam centerline 94 by the z-axis correction factor. Specifically, z-axis position of detector array 18 is adjusted until:

$$\text{z-axis correction factor} = (S*[(B-A)/(A+B)]),$$

where S is a scale factor and is dependent on the shape of beam 16.

For example, where S has been determined to be 4.7 and for a center adjustment point detector array channel, respective signal intensities A=40 and B=60, the determined z-axis position of detector array 18 is (4.7*[(60−40)/(40+60)])= 0.94 mm. If the z-axis correction factor for correction of thermal drift of x-ray beam 16 is −1 mm, the position of detector array must be altered by 1.94 mm, i.e., the distance between −1 mm and 0.94 mm. Specifically, the position of detector array 18 must be adjusted so that the intensity of signal B is reduced. This is accomplished by adjustment of detector array 18 so that the intensity of signal A becomes larger than intensity of signal B. For example, if position of detector array 18 is adjusted so that the intensity of signal B is 39 and the intensity of signal A is 61, position of detector array 18 would be approximately −1 mm. Specifically, (4.7*[39−61)/(61+39)])≈−1 mm. As a result, detector array 18 is properly adjusted.

In a similar manner, each adjustment point of detector array 18 is adjusted so that entire detector array 18 is properly positioned. Specifically, in one embodiment, the z-axis position of detector array 18 is determined for a left, center and right adjustment point (not shown) by collecting signal intensities from at least one channel surrounding each adjustment point. In another embodiment, signal intensities from a plurality of channels surrounding each adjustment point may be used to determine z-axis position of detector array 18. Specifically, for example, the signal intensities may be averaged to determine the z-axis position of detector array 18. In addition, the z-axis correction factor may compensate, or correct for movement of other components as well as collimation and alignment tolerances.

By using the above described ratio and correction factor, as opposed to a separate alignment device, detector array position accuracy is improved. As a result, artifacts will be reduced and image quality will be optimized without significantly increasing the system costs and without requiring separate alignment tools to determine detector array position.

Figure 6:
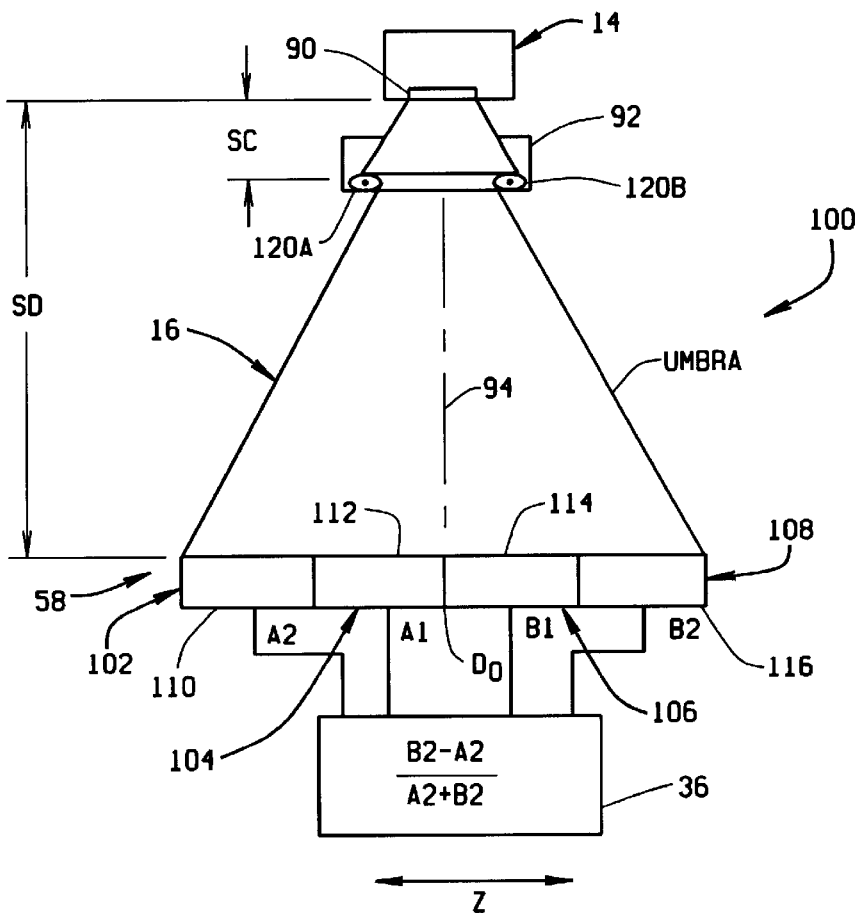
FIG. 6 is a schematic view of an alternative embodiment of the CT imaging system.

FIG. 6 is a simplified schematic view of another embodiment of a detector array position determination system 100 in accordance with the present invention. Components in system 100 which are identical to components in system 80 (FIG. 5) are identified in FIG. 6 using the same reference numerals as used in FIG. 5. System 100 is a "four (or quad) slice" system in that four rows 102, 104, 106 and 108 of detector cells are utilized to obtain projection data. Detector cells, sometimes referred to as z position cells, 110, 112, 114 and 116 are utilized for determining x-ray beam z-axis profile and detector array z-axis position. In one embodiment, collimator 92 of system 100 includes eccentric cams 120A and 120B. The position of cams 120A and 120B are controlled by x-ray controller 28. Cams 120A and 120B are positioned on opposing sides of fan beam plane 94 and may be independently adjusted with respect to the spacing between cams 120A and 120B and their location relative to fan beam plane 94. Cams 120A and 120B may be positioned with a single cam drive, or alternatively, each cam may be positioned with a separate cam drive, for example a motor. Cams 120A and 120B are fabricated from an x-ray absorbing material, for example, tungsten.

As a result of the eccentric shape, the rotation of respective cams 120A and 120B alters the z-axis profile of x-ray beam 16. More specifically, altering position of cams 120A and 120B alters the position and width of x-ray beam umbra. Particularly, as a result of the jointly stepping eccentric shape of cams 120A and 120B, the total width of x-ray beam umbra is altered. Altering the position, or stepping, cam 120A, alone, alters the umbra width and position relative to one edge of detector array 18. Altering the position of cam 120B, alone, alters the umbra width and position relative to the other, or second edge, of detector array 18 so that the x-ray dosage received by patient 22 is reduced.

In one embodiment, system 100 adjusts an aperture of collimator 92 so that edges of x-ray beam umbra are located directly over respective edges of detector array 18. More specifically, utilizing signals from cells 110, 112, 114, and 116, respective cams 120A and 120B are positioned so that the edge of x-ray beam umbra is located directly over respective cells 110 and 116.

In operation, x-ray source 14 is fixed, or placed in a stationary position, and respective cams 120A and 120B are placed in nominal positions so that an x-ray beam 16 is radiated through collimator 92 toward detector array 18. Data is then collected from detector array 18 for a series of steps, or positions of respective cam 120A and 120B. By altering aperture of collimator 92, particularly adjusting cams 120A and 120B, an optimal x-ray beam is radiated onto detector array 18 to produce proper signal intensities from cells 110, 112, 114 and 116 while minimizing dosage to patient 22.

More specifically, utilizing the resulting data, the optimal x-ray beam umbra width is determined. Particularly, after positioning x-ray source 14 and cams 120A and 120B, x-ray source 14 is enabled so that x-ray beam 16 is radiated toward detector array 18, particularly cells 110, 112, 114 and 116. Respective signal intensity data 2A, 1A, 1B, and 2B is then collected from respective detector cells 110, 112, 114 and 116 for defined period of time. The position of respective cams 120A and 120B are then advanced so that the z-axis profile of beam 16 is altered. After allowing time for positioning of cams 120A and 120B, data is collected for the altered position of collimator 52. More specifically, data is collected from detector cells 110 and 112 for cam 120A and data is collected for the altered position of cam 120B using detector cells 114 and 116. The described process is then repeated for each position of cams 120A and 120B within a defined aperture range.

For example, after selecting an initial, or typical collimator aperture, respective cams 120A and 120B are then positioned at a first side aperture position and a second side aperture position to reduce collimator aperture by 0.5 mm so that beam 16 radiated toward detector array 18 has a reduced z-axis profile. Data is then collected for 100 milliseconds (mS) from respective cells 110 and 116 and a single average value for each cell is determined. Respective cams 120A and 120B are then advanced so that aperture of collimator 92 increases by 0.025 mm. After waiting 100 mS for adjustment of collimator cams 120A and 120B, data is collected from respective detector cells 110 and 116. This process is repeated until collimator aperture has increased by 0.5 mm from the initial aperture.

Figure 7:
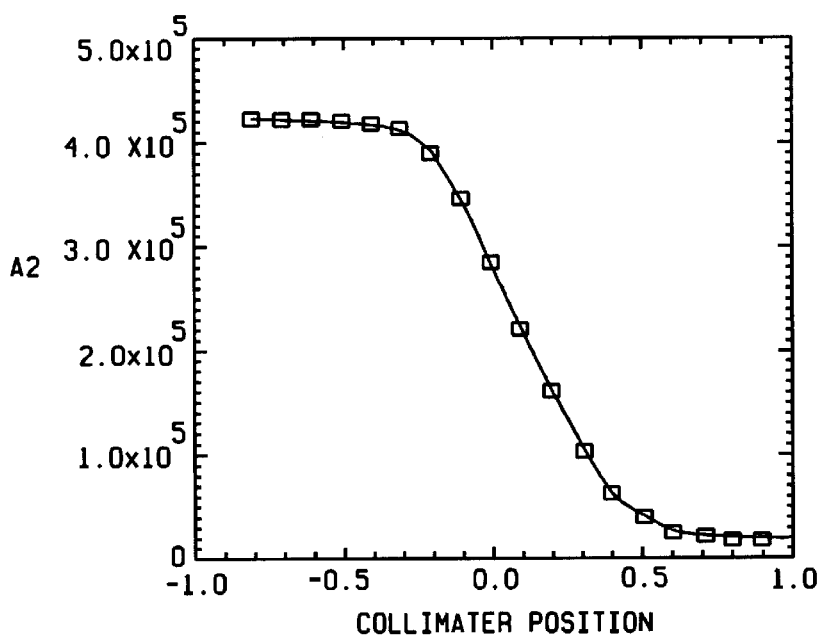
FIG. 7 is a graph illustrating detector cell signal versus collimator offset position.

The resulting data is then used to determine the position of cams 120A and 120B to generate an optimal z-axis profile. More specifically and in one embodiment, the resulting data is used to determine where the edges of the x-ray beam umbra align with the edges of detector array 18. For example, where data collected from detector cell 110 is shown in FIG. 7, a maximum value is determined from the collected data, i.e., data from cell 110. The optimal position of collimator 92, specifically cam 120A, is then determined. In one embodiment, cam 120A is positioned where the cell signal is 98% of the maximum cell signal. Specifically, by interpolating between positions where the signal intensity is greater or less than 98% of the maximum value, the optimal position of cams 120A may be determined. The position of cam 120B is then determined in a manner similar to cam 120A using data from cell 116 so that cam 120B is properly positioned. In alternative embodiments, cams 120A and 120B may be positioned so that the ratio of the signal to the maximum signal produce the maximum acceptable differential channel error.

Figure 8:
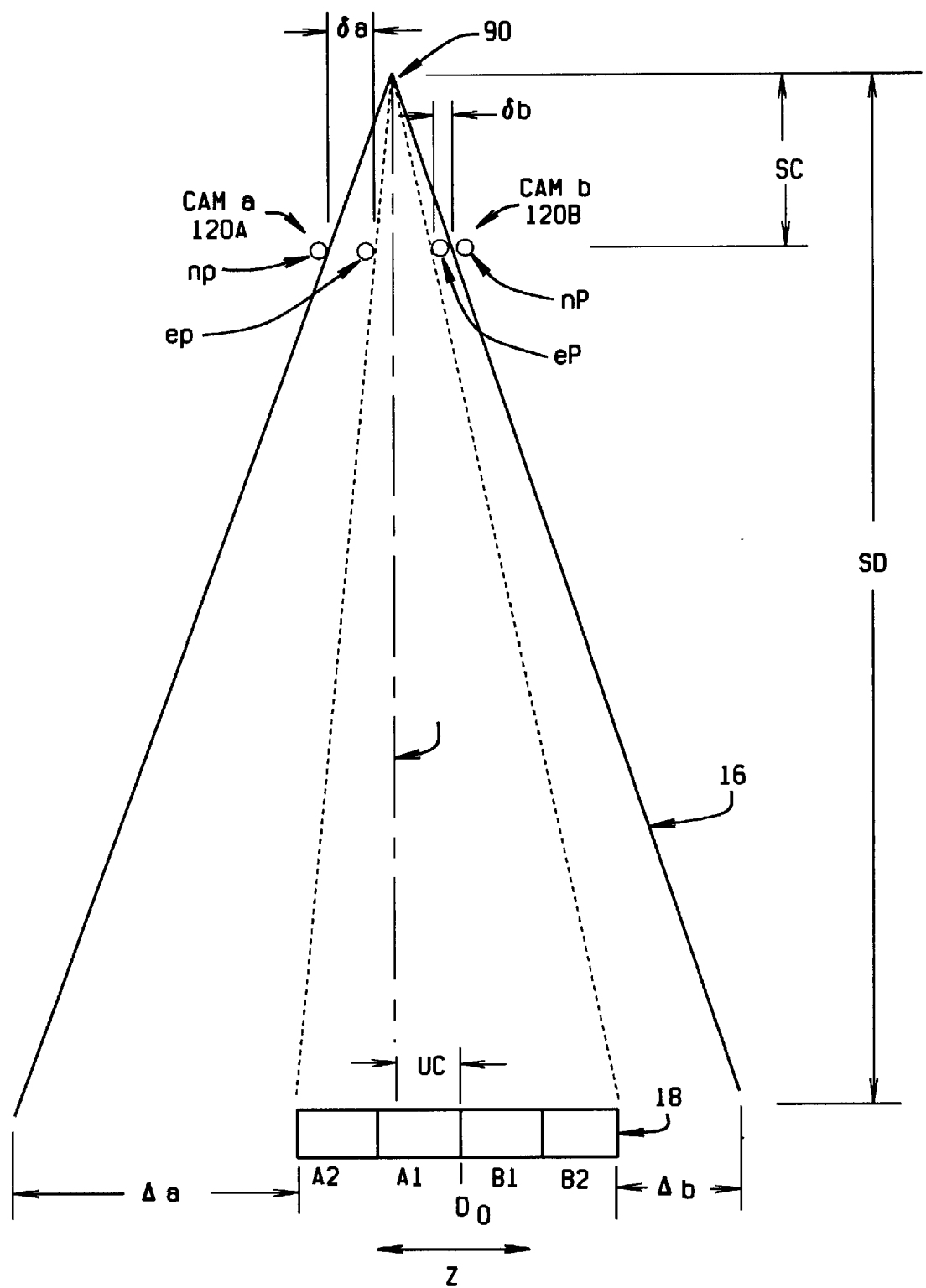
FIG. 8 is a schematic view of one embodiment of the CT imaging system shown in FIG. 1.

In one embodiment and as shown in FIG. 8, the position of the x-ray beam umbra relative to the centerline of detector array 18 is determined by:

$$uc(i)=(\Delta(i,a)-\Delta(i,b))/2$$

where:

uc=umbra center (difference between center of detector and center of beam), i=channel index, a=cam a, b=cam b, Δ=difference between nominal position and edge position at detector, $$\Delta(i,c) = \delta(i,c) * \frac{SD(i,c)}{SC(i,c)},$$

SD=distance between x-ray source and detector,

SC=distance between x-ray source and collimator cams,

δ(i,c)=distance between nominal initial cam position and measured edge cam position, $$\delta(i,c)=ep(i,c)-np(i,c);$$

c=cam a or cam b, ep=measured cam edge position relative to beam center that intersects detector edge, np=nominal initial cam position relative to beam center, where np(a)=np(b).

The above described alternative embodiment determines proper position of the detector array and alters the z-axis profile of the x-ray beam. In addition, the x-ray beam is optimized to improve image quality without increasing patient dosage.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the CT system described herein is a "third generation" system in which both the x-ray source and detector rotate with the gantry. Many other CT systems including "fourth generation" systems wherein the detector is a full-ring stationary detector and only the x-ray source rotates with the gantry, may be used. Similarly, while the systems described herein have been two-slice and four-slice, any multi-slice system may be used. Moreover, while the detector array position determination system has been described in detail, the position of the detector array and the x-ray beam profile may be determined using computer 36. For example, using an algorithm stored in a memory of computer 36, the above described ratio and relationships may be determined by computer 36 to control the position of the pre-patient collimator cams to alter the x-ray beam umbra as well as generate an output to the cathode ray tube display for use by the operator in adjusting the detector array. Accordingly, the spirit and scope of the invention are to be limited only by the terms of the appended claims.

What is claimed is:

1. A method for aligning a detector array position in an imaging system, the imaging system including a multislice detector array having at least two rows of detector cells displaced along a z-axis and an x-ray source for radiating an x-ray beam toward the detector array, said method comprising the steps of:

determining an x-ray beam z-axis profile using the detector array; and adjusting position of the detector array based on the determined x-ray beam z-axis profile.

2. A method in accordance with claim 1 wherein determining an x-ray beam z-axis profile comprises the step of determining an x-ray beam umbra position.

3. A method in accordance with claim 2 wherein adjusting position of the detector array comprises the step of offsetting the detector array position from the x-ray beam umbra position by a z-axis correction factor.

4. A method in accordance with claim 2 wherein determining an x-ray beam z-axis profile comprises the steps of:

obtaining separate signals from at least a first detector cell in a first detector cell row and a second detector cell in a second detector cell row of the detector array; and determining the x-ray beam umbra position from the intensities of the separate signals.

5. A method in accordance with claim 2 wherein the signal from the first detector cell has an intensity A and the signal from the second detector cell has an intensity of B, and determining x-ray beam umbra position from the intensities A and B is performed using the relationship [(B−A)/(A+B)].

6. A method in accordance with claim 5 wherein adjusting position of the detector array is performed using the relationship:

$$\text{z-axis correction factor}=(S*[(B-A)/(A+B)]),$$

where:

S=a z-axis distance scale factor.

7. A method in accordance with claim 2 wherein the imaging system further includes an adjustable pre-patient collimator having a plurality of positions for altering the z-axis profile of the x-ray beam, wherein determining the z-axis profile comprises the steps of:

radiating the x-ray beam toward the detector array; and altering the position of the pre-patient collimator while collecting data from the detector array for each position of the collimator.

8. A method in accordance with claim 7 wherein adjusting position of the detector array based on the determined x-ray beam z-axis profile comprises the step of positioning the detector array within the x-ray beam umbra.

9. A method in accordance with claim 2 wherein determining the x-ray beam umbra position comprises the step of determining an x-ray beam umbra center.

10. A method in accordance with claim 9 wherein the pre-patient collimator includes at least a first cam and a second cam positioned on opposing sides of the x-ray beam, and wherein the x-ray beam umbra center is:

$$uc(i)=(\Delta(i,a)-\Delta(i,b))/2,$$

where:

uc=umbra center (difference between center of detector and center of beam), i=channel index, a=cam a, b=cam b, Δ=difference between nominal position and edge position at detector, $$\Delta(i, c) = \delta(i, c) * \frac{SD(i, c)}{SC(i, c)},$$

SD=distance between x-ray source and detector,

SC=distance between x-ray source and collimator cams,

δ(i,c)=distance between nominal initial cam position and measured edge cam position, $$\delta(i,c)=ep(i,c)-np(i,c);$$

c=cam a or cam b, ep=measured cam edge position relative to beam center that intersects detector edge, np=nominal initial cam position relative to beam center, where np(a)=np(b).

11. A system for aligning a detector array position in an imaging system, the imaging system including a multislice detector array having at least two rows of detector cells displaced along a z-axis and an x-ray source for radiating an x-ray beam toward the detector array, said system configured to:

determine an x-ray beam z-axis profile using the detector array; and adjust position of the detector array based on the determined x-ray beam z-axis profile.

12. A system in accordance with claim 11 wherein to determine an x-ray beam z-axis profile, said system is configured to determine an x-ray beam umbra position.

13. A system in accordance with claim 12 wherein to adjust position of the detector array, said system configured to offset the detector array position from the x-ray beam umbra position by a z-axis correction factor.

14. A system in accordance with claim 12 wherein to determine an x-ray beam z-axis profile, said system configured to:

obtain separate signals from at least a first detector cell in a first detector cell row and a second detector cell in a second detector cell row of the detector array; and determine the x-ray beam umbra position from the intensities of the separate signals.

15. A system in accordance with claim 12 wherein the signal from the first detector cell has an intensity A and the signal from the second detector cell has an intensity of B, and said system configured to determine x-ray beam umbra position from the intensities A and B using the relationship $[(B-A)/(A+B)]$.

16. A system in accordance with claim 15 wherein to adjust position of the detector array, said system configured to determine position of detector array where:

$(S*[(B-A)/(A+B)])$=z-axis correction factor, where:

S=a z-axis distance scale factor.

17. A system in accordance with claim 12 wherein the imaging system further includes an adjustable pre-patient collimator having a plurality of positions for altering the z-axis profile of the x-ray beam, wherein to determine the z-axis profile, said system configured to:

radiate the x-ray beam toward the detector array; and alter the position of the pre-patient collimator while collecting data from the detector array for each position of the collimator.

18. A system in accordance with claim 17 wherein to adjust position of the detector array based on the determined x-ray beam z-axis profile, said system configured to position the detector array within the x-ray beam umbra.

19. A system in accordance with claim 12 wherein to determine the x-ray beam umbra position, said system configured to determine an x-ray beam umbra center.

20. A system in accordance with claim 19 wherein the pre-patient collimator includes at least a first cam and a second cam positioned on opposing sides of the x-ray beam, and wherein the x-ray beam umbra center is:

$$uc(i)=(\Delta(i,a)-\Delta(i,b))/2,$$

where:

uc=umbra center (difference between center of detector and center of beam), i=channel index, a=cam a, b=cam b, Δ=difference between nominal position and edge position at detector, $$\Delta(i, c) = \delta(i, c) * \frac{SD(i, c)}{SC(i, c)},$$

SD=distance between x-ray source and detector,

SC=distance between x-ray source and collimator cams,

δ(i,c)=distance between nominal initial cam position and measured edge cam position, $$\delta(i,c)=ep(i,c)-np(i,c);$$

c=cam a or cam b, ep=measured cam edge position relative to beam center that intersects detector edge, ep=measured cam edge position relative to beam center that intersects detector edge, np=nominal initial cam position relative to beam center, where np(a)=np(b).

21. An imaging system comprising a multislice detector array having at least two rows of detector cells displaced along a z-axis, an x-ray source for radiating an x-ray beam toward the detector array, and a computer coupled to said detector array and said x-ray source, said computer programmed to:

determine an x-ray beam z-axis profile using said detector array; and determine an adjusted position of said detector array based on the determined x-ray beam z-axis profile.

22. An imaging system in accordance with claim 21 wherein to determine an x-ray beam z-axis profile, said computer is programmed to determine an x-ray beam umbra position.

23. An imaging system in accordance with claim 22 wherein to adjust position of the detector array, said computer is programmed to offset said detector array position from said x-ray beam umbra position by a z-axis correction factor.

24. An imaging system in accordance with claim 22 wherein to determine said x-ray beam z-axis profile, said computer programmed to:

obtain separate signals from at least a first detector cell in a first detector cell row and a second detector cell in a second detector cell row of said detector array; and determine said x-ray beam umbra position from intensities of said separate signals.

25. An imaging system in accordance with claim 22 wherein said signal from said first detector cell has an intensity A and said signal from said second detector cell has an intensity of B, said computer programmed to determine x-ray beam umbra position from said intensities A and B using relationship $[(B-A)/(A+B)]$.

26. An imaging system in accordance with claim 25 wherein to determine an adjusted position of said detector array, said computer programmed to determine the relationship $$(S*[(B-A)/(A+B)])=\text{z-axis correction factor,}$$

where:

S=a z-axis distance scale factor.

27. An imaging system in accordance with claim 22 wherein said imaging system further includes an adjustable pre-patient collimator having a plurality of positions for altering said z-axis profile of said x-ray beam, wherein to determine said z-axis profile, said computer programmed to:

enable said x-ray source to radiate said x-ray beam toward said detector array; and alter said position of said pre-patient collimator while collecting data from the detector array for each position of said collimator.

28. An imaging system in accordance with claim 22 wherein to determine said x-ray beam umbra position, said computer programmed to determine an x-ray beam umbra center.

29. An imaging system in accordance with claim 28 wherein said pre-patient collimator comprises at least a first cam and a second cam positioned on opposing sides of said x-ray beam, said computer programmed to determine said umbra center, where umbra center is:

$$uc(i)=(\Delta(i,a)-\Delta(i,b))/2,$$

where:

uc=umbra center (difference between center of detector and center of beam), i=channel index, a=cam a, b=cam b, Δ=difference between nominal position and edge position at detector, $$\Delta(i, c) = \delta(i, c) * \frac{SD(i, c)}{SC(i, c)},$$

SD=distance between x-ray source and detector,

SC=distance between x-ray source and collimator cams,

δ(i,c)=distance between nominal initial cam position and measured edge cam position, $$\delta(i,c)=ep(i,c)-np(i,c);$$

c=cam a or cam b, ep=measured cam edge position relative to beam center that intersects detector edge, np=nominal initial cam position relative to beam center, where np(a)=np(b).

* * * * *